US009501312B2

(12) United States Patent
Little

(10) Patent No.: US 9,501,312 B2
(45) Date of Patent: Nov. 22, 2016

(54) USING COMPENSATION TRANSACTIONS FOR MULTIPLE ONE-PHASE COMMIT PARTICIPANTS

(71) Applicant: Red Hat, Inc., Raleigh, NC (US)

(72) Inventor: Mark Cameron Little, Ebchester (GB)

(73) Assignee: Red Hat, Inc., Raleigh, NC (US)

( * ) Notice: Subject to any disclaimer, the term of this patent is extended or adjusted under 35 U.S.C. 154(b) by 330 days.

(21) Appl. No.: 14/168,893

(22) Filed: Jan. 30, 2014

(65) Prior Publication Data

US 2015/0212850 A1    Jul. 30, 2015

(51) Int. Cl.
*G06F 17/30* (2006.01)
*G06F 9/46* (2006.01)

(52) U.S. Cl.
CPC ......... *G06F 9/466* (2013.01); *G06F 17/30371* (2013.01)

(58) Field of Classification Search
CPC .......................... G06F 17/30371; G06F 9/466
USPC ............................................................ 707/703
See application file for complete search history.

(56) References Cited

U.S. PATENT DOCUMENTS

| | | | | |
|---|---|---|---|---|
| 5,258,982 A * | 11/1993 | Britton | ................... | H04L 29/06 370/408 |
| 5,261,089 A * | 11/1993 | Coleman | ................. | G06F 9/466 |
| 5,452,445 A * | 9/1995 | Hallmark | .......... | G06F 17/30575 |
| 5,561,797 A * | 10/1996 | Gilles | ..................... | G06F 9/466 |
| 5,924,095 A * | 7/1999 | White | ..................... | G06F 9/466 |
| 6,061,708 A * | 5/2000 | McKeehan | ............. | G06F 9/466 718/101 |
| 6,247,038 B1 * | 6/2001 | Banks | .................... | G06F 9/466 718/100 |
| 7,380,166 B2 | 5/2008 | Thatte et al. | | |
| 7,900,085 B2 * | 3/2011 | Little | ................... | G06F 11/203 714/10 |
| 7,917,470 B2 | 3/2011 | Barnes et al. | | |
| 7,921,220 B2 | 4/2011 | Barsness et al. | | |
| 8,074,220 B2 * | 12/2011 | Thole | ..................... | G06F 9/466 707/607 |

(Continued)

FOREIGN PATENT DOCUMENTS

JP    2004295272 A    10/2004
JP    2007011550 A    1/2007

OTHER PUBLICATIONS

Bunting, Doug, et al., "Web Services Coordination Framework (WS-CF)", Web Services Coordination Framework Specification, © 2003, 63 pages.*

(Continued)

*Primary Examiner* — Robert Stevens
(74) *Attorney, Agent, or Firm* — Haynes and Boone, LLP

(57) ABSTRACT

An example system includes a registration engine that receives a request to register with a transaction. The request is from a one-phase commit resource manager. The example system also includes a proxy instantiation engine that determines whether a list of registered participants of the transaction includes at least one one-phase commit resource manager. When the list of registered participants is determined to include at least one one-phase commit resource manager, the proxy instantiation engine: (i) creates a proxy for the one-phase commit resource manager, and (2) adds the proxy to the list of registered participants. The proxy supports a prepare operation, commit operation, and abort operation. The system further includes a first-phase coordinator that sends a commit query to each registered two-phase commit participant included in the list. The commit query requests an indication of whether the respective participant can commit the transaction.

20 Claims, 6 Drawing Sheets

(56) References Cited

U.S. PATENT DOCUMENTS

| | | | | |
|---|---|---|---|---|
| 8,346,851 | B2* | 1/2013 | Little | G06F 9/466 709/201 |
| 2002/0194242 | A1* | 12/2002 | Chandrasekaran | G06F 9/466 718/101 |
| 2009/0144750 | A1* | 6/2009 | Little | G06F 13/385 719/313 |
| 2009/0300074 | A1* | 12/2009 | Little | G06F 17/30377 |
| 2010/0306490 | A1* | 12/2010 | Little | G06F 9/466 711/163 |
| 2011/0246822 | A1* | 10/2011 | Little | G06F 9/466 714/16 |

OTHER PUBLICATIONS

Kikuchi, Shinji, "On Realizing Quick Compensation Transactions in Cloud Computing", DNIA 2010, LNCS 5999, Springer-Verlag, Berlin, Germany, © 2010, pp. 46-64.*

Saheb, Malik, et al., "Open Nested Transactions: A Support for Increasing Performance and Multi-tier Applications", TDD '99, LNCS 1773, Springer-Verlag, Berlin, Germany, © 2000, pp. 167-192.*

Art Jolin, Integrating WebSphere Extreme Scale Transactions with Other Transactions, May 9, 2012, pp. 1-17, IBM Corporation 2012; http://www.ibm.com/developerworks/websphere/techjournal/1205_jolin/1205_jolin.html.

Mark Little, Enlisting Multiple 1-Phase Aware Participants in the Same Transaction, 2 pages; retrieved from https://community.jboss.org/wiki/Multiple1PC on Jan. 30, 2014.

Using One-Phase and Two-Phase Commit Resources in the Same Transaction, 1 page, retrieved from http://pic.dheibm.com/infocenter/wasinfo/v8r5/index.jsp?topic=%2Fcom.ibm.websphere.express.doc%2Fiao%2Ftasks%2Ftla_ep.html on Jan. 30, 2014.

Optimization Using Single Phase Commit and Promotable Single Phase Notification, retrieved from http://msdn.microsoft.com/en-us/library/ms229980(v=vs.85).aspx on Dec. 16, 2013, 3 pages.

Mark Little, Heuristics, One-Phase Commit and Compensations, retrieved from http://markclittle.blopspot.in/2007/08/heuristics-one-phase-commit-and.html Jan. 30, 2014, 4 pages.

Mark Little; JUDCON JBoss Users & Developers Conference Boston:2011, JBoss by Red Hat, Presentation, pp. 1-28, retrieved from https://www.jboss.org/dms/judcon/presentations/Boston2011/JUDConBoston2011_day2track3session1.pdf on Jan. 30, 2014.

Dr. Mark Little, A History of Extended Transactions; 26 pages, retrieved from http://www.infoq.com/articles/History-of-Extended-Transactions on Jan. 30, 2014.

* cited by examiner

USING COMPENSATION TRANSACTIONS FOR MULTIPLE ONE-PHASE COMMIT PARTICIPANTS

FIELD OF DISCLOSURE

The present disclosure generally relates to transactions, and more specifically to enabling multiple one-phase commit resource managers to participant within the scope of a transaction.

BACKGROUND

Transaction systems have been around for decades and typically use a two-phase commit protocol to achieve atomicity between participants. In particular, a transaction typically satisfies the properties of Atomicity, Consistency, Isolation and Durability, known commonly as the ACID properties. According to the Atomicity property, either the transaction successfully executes to completion, and the effects of all operations are recorded, or the transaction fails. In other words, all of the participants either commit the transaction or all of them roll it back (cancel the transaction). The Consistency property requires that the transaction does not violate integrity constraints of shared objects of the transaction. The Isolation property requires that intermediate effects of the transaction are not detectable to concurrent transactions. Finally, the Durability property requires that changes to shared objects due to the transaction are permanent.

To achieve the Atomicity property, all participants of the transaction coordinate their actions so that they either unanimously abort or unanimously commit to the transaction. Under the two-phase commit protocol, the transaction system performs the commit operation in two phases. During the first phase of the two-phase commit protocol, commonly known as the "prepare phase" or "request phase", a coordinator (a node in the computing system managing the transaction) asks all participants of the transaction whether they are willing to commit to the transaction. During the second phase of the two-phase commit protocol, commonly known as the "commit/abort phase", the coordinator determines whether the transaction should be completed. If during the prepare phase all participants committed to the transaction, the coordinator successfully completes the transaction. If during the prepare phase one or more participants failed to commit to the transaction, the coordinator does not complete the transaction.

In some cases resource managers may not be two-phase aware, which means they cannot prepare (go into a holding state and wait to make state changes). In such cases, these resource managers may be one-phase commit resource managers and can either do the work (state changes) or not do the work. It may be beneficial to enlist resource managers that are not two-phase aware into a two-phase commit transaction. In an example, a single resource manager that is one-phase aware (e.g., can only commit or roll back, with no prepare) may be enlisted in a two-phase transaction. In such an example, the coordinator may treat the one-phase commit resource manager slightly differently, in that it executes the prepare phase on all other resource managers first, and if the coordinator then intends to commit the transaction the coordinator passes control to the one-phase commit resource manager. The transaction may have a single Last Resource Commit optimization (LRCO) slot, in which a single one-phase commit resource manager may be inserted. If the one-phase commit resource manager commits, then the coordinator logs the decision to commit and attempts to commit the other resource managers as well. The use of LRCO, however, is limited to transactions having a single participant that is one-phase aware.

BRIEF SUMMARY

This disclosure relates to distributed transactions that have multiple one-phase aware participants. Methods, systems, and techniques for processing a distributed transaction are provided.

According to an embodiment, a system for processing a distributed transaction includes a registration engine coupled to a network. The registration engine receives a request to register with a transaction. The request is from a one-phase commit resource manager. The system also includes a proxy instantiation engine that determines whether a list of registered participants of the transaction includes at least one one-phase commit resource manager. When the list of registered participants is determined to include at least one one-phase commit resource manager, the proxy instantiation engine: (i) creates a proxy for the one-phase commit resource manager, and (2) adds the proxy to the list of registered participants. The proxy supports a prepare operation, commit operation, and abort operation. The system further includes a first-phase coordinator that coordinates a first phase of the two-phase commit transaction. The first-phase coordinator sends a commit query to each registered two-phase commit participant included in the list. The commit query requests an indication of whether the respective participant can commit the transaction.

According to another embodiment, a method of processing a distributed transaction includes receiving at a transaction manager of a two-phase commit transaction a request to register with a transaction. The request is from a one-phase commit resource manager. The method also includes determining whether a list of registered participants of the transaction includes at least one one-phase commit resource manager. The method further includes when the list of registered participants is determined to include at least one one-phase commit resource manager: (i) creating a proxy for the one-phase commit resource manager, and (2) adding the proxy to the list of registered participants. The proxy supports a prepare operation, commit operation, and abort operation. The method also includes sending a commit query to each registered two-phase commit participant included in the list. The commit query requests an indication of whether the respective participant can commit the transaction.

According to another embodiment, a non-transitory machine-readable medium including a plurality of machine-readable instructions that when executed by one or more processors is adapted to cause the one or more processors to perform a method including: receiving a request to register with a transaction, the request being from a one-phase commit resource manager; determining whether a list of registered participants of the transaction includes at least one one-phase commit resource manager; when the list of registered participants is determined to include at least one one-phase commit resource manager: (i) creating a proxy for the one-phase commit resource manager, the proxy supporting a prepare operation, commit operation, and abort operation; and (ii) adding the proxy to the list of registered participants; and sending a commit query to each registered two-phase commit participant included in the list, the commit query requesting an indication of whether the respective participant can commit the transaction.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

DETAILED DESCRIPTION

Figure 1:
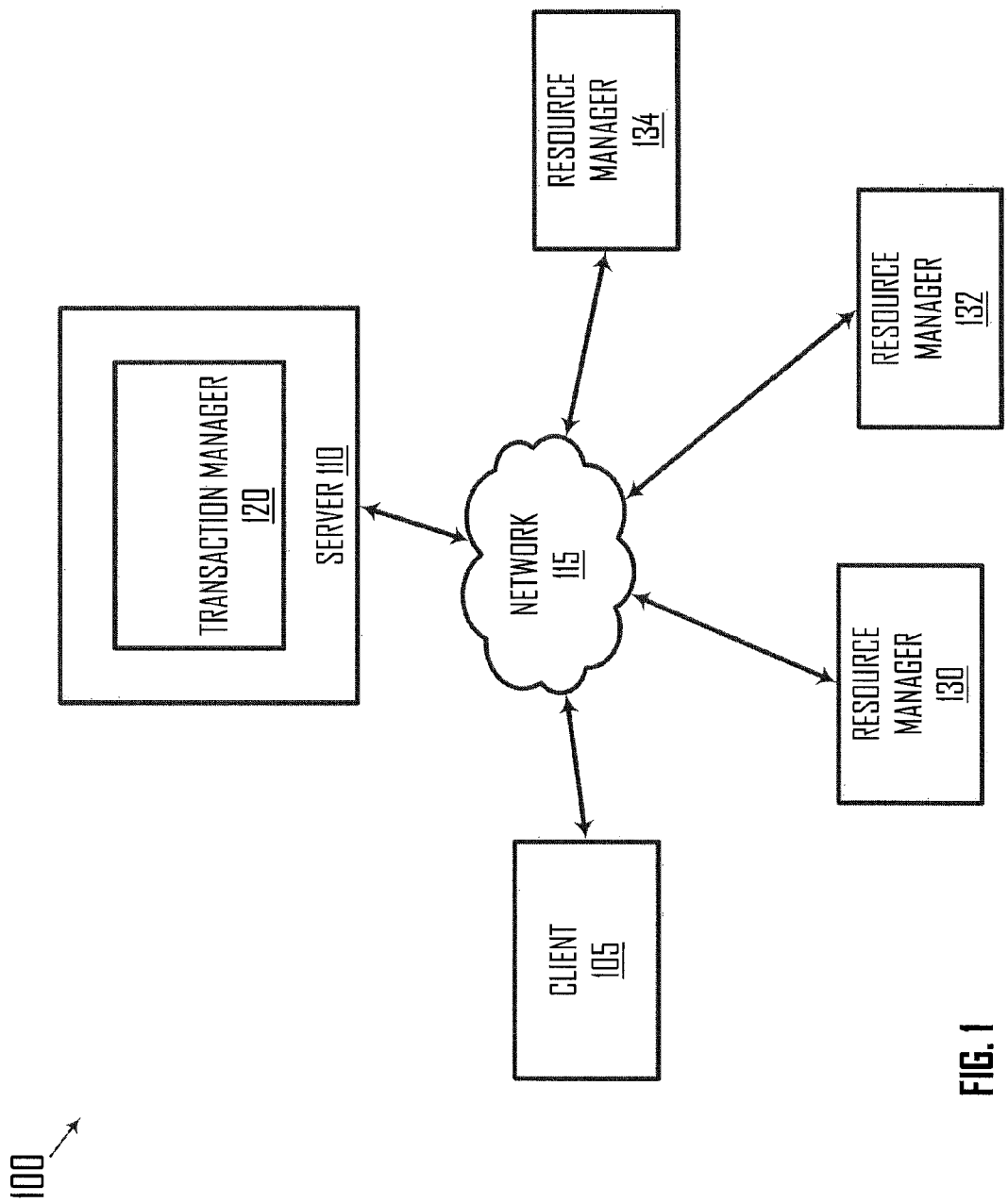
FIG. 1 is a block diagram illustrating a transaction computing system for processing a distributed transaction, according to an embodiment.

I. Overview
II. Example System Architecture
III. Example Interaction Between Transaction Manager and Registered Participants
IV. Registration
   A. No One-Phase Commit Participants
   B. A Single One-Phase Commit Participant
   C. Multiple One-Phase Commit Participants
   1. Proxy Creation
   2. Register Proxy Instead of the One-Phase Commit Resource Manager
V. Two-Phase Commit Transaction
   A. First Phase of the Two-Phase Commit Transaction
   B. Second Phase of the Two-Phase Commit Transaction
   1. Commit Instruction
   2. Abort Instruction
VI. Example Method
VII. Example Computing System I. Overview It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

A one-phase commit resource manager can be instructed to either commit the transaction or abort the transaction but may be incapable of being in the indeterminate state of whether to commit or abort the transaction. For example, the one-phase commit resource manager may be capable of either committing or rolling back the transaction, but not "preparing" the transaction to commit it. The LRCO may be used to enroll a one-phase commit resource manager with a transaction and still obtain the ACID semantics. The LRCO slot, however, may only be occupied by a single such resource manager.

Many one-phase aware resource managers exist today. For example, many database vendors provide one-phase aware databases. Oftentimes, a developer or programmer does not know that he or she is working with a one-phase aware database that is not two-phase capable. The developer or programmer may find out that the database is one-phase aware when he or she tries to perform an action in a transaction and the transaction manager provides a message indicating that the transaction manager cannot work with the particular database because a one-phase commit participant is already registered with the transaction. Even worse, this may occur at runtime and break the application.

The present disclosure provides techniques using other forms of transactions that relax ACID properties and enable multiple one-phase commit resource managers to be enlisted in the transaction. An extended transaction relaxes ACID properties, and may result in non-atomic outcomes and weak consistencies. Accordingly, an extended transaction does not have ACID guarantees and cannot ensure that the state of the system moves to the same state that it had before the transaction occurred. For an application, the extended transaction works automatically to try to obtain the same state that the system had before the transaction occurred. An example of an extended transaction is a compensation transaction, whereby a transaction is committed and in the event of a failure a compensating transaction is executed to undo the work that was previously committed.

Compensating transactions may be useful for managing transactions that last a long period of time. A compensating transaction compensates for the effects of the transaction. For example, a compensating transaction for a deposit into a bank account would be a transaction that cancels the deposit and "undoes" the deposit (e.g., decreases the amount in the bank account by the same amount of the deposit). The compensating transaction is a unit of work that is "fired off" to undo a previous unit of work. In an extended transaction, a dirty state may be seen between the time that the transaction commits and the time that it is rolled back. The system administrator or developer can make the choice of the possibility of someone seeing the dirty state, and whether to compensate following some chain of events. Further, extended transactions may have nondurable results.

In an embodiment, a method of processing a distributed transaction includes receiving at a transaction manager of a two-phase commit transaction a request to register with a transaction. The request is from a one-phase commit resource manager. The method also includes determining whether a list of registered participants of the transaction includes at least one one-phase commit resource manager. The method further includes when the list of registered participants is determined to include at least one one-phase commit resource manager, creating a proxy for the one-phase commit resource manager and adding the proxy to the list of registered participants. The proxy supports a prepare operation, commit operation, and abort operation. The method also includes sending a commit query to each registered two-phase commit participant included in the list. The commit query requests an indication of whether the respective participant can commit the transaction.

Unless specifically stated otherwise, as apparent from the following discussion, it is appreciated that throughout the description, discussions utilizing terms such as "sending", "receiving", "determining", "creating", and "adding", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

II. Example System Architecture

FIG. 1 is a block diagram illustrating a transaction computing system 100 for processing a distributed transaction, according to an embodiment. System 100 may include a service-oriented architecture (SOA) (an information system architecture that organizes and uses distributed capabilities (services) for one or more applications). An SOA provides a uniform mechanism to offer, discover, interact with and use capabilities (services) distributed over a network. Through the SOA, an application may be designed that combines loosely coupled and interoperable services. In an example, a compensation transaction may be aimed at Web Services.

In an embodiment, system 100 includes an enterprise service bus (ESB). An ESB is an event-driven and standards-based messaging engine that provides services for more complex architectures. The ESB provides an infrastructure that links together services and clients to enable distributed applications and processes. The ESB may be implemented to facilitate an SOA. The ESB may be a single bus that logically interconnects all available services and clients. Alternatively, the ESB may include multiple busses, each of which may logically interconnect different services and/or clients.

System 100 includes one or more clients 105 and one or more servers 110 connected via a network 115. Client 105 may be a personal computer (PC), workstation, mobile device (e.g., a mobile phone, personal digital assistant (PDA), tablet, and laptop), game console, set-top box, kiosk, embedded system, or other device having at least one processor and memory. Client 105 may also be an application run on a PC, server, database, etc. In the SOA, client 105 includes an application that accesses services. Client 105 may be a fat client (e.g., a client that performs local processing and data storage), a thin client (e.g., a client that performs minimal or no local processing and minimal to no data storage), and/or a hybrid client (e.g., a client that performs local processing but little to no data storage).

Server 110 may host services, applications, and/or other functionality that is available to client 105 on system 100. Server 110 may be a single machine or may include multiple interconnected machines (e.g., machines configured in a cluster). Network 115 may be a private network (e.g., local area network (LAN), wide area network (WAN), intranet, etc.), a public network (e.g., the Internet), or a combination thereof. The network may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing.

Server 105 is coupled to resource managers 130, 132, and 134 over network 115. Although server 105 is illustrated as being coupled to one client and three resource managers, this is not intended to be limiting. For example, server 105 may be coupled to one or more clients and/or may be coupled to one or more resource managers. A resource manager is a software module that manages a persistent and stable storage system. The resource manager may execute on a computing device having at least one processor and memory.

In an example, the resource manager is a database or a file system. In another example, the resource manager is a message server implementation. The message server implementation may be, for example, MQSeries® or Java® Message Service (JMS). In another example, the resource manager is a distributed cache. The distributed cache may be an in-memory cache implementation with multiple computing devices sharing their memory and using the shared memory to store data (e.g., cached data from the database) rather than the database because memory accesses are faster than disk accesses. Trademarks are the property of their respective owners.

Server 105 includes a transaction manager 120. A transaction manager is a software module that coordinates multiple participants during a transaction. In an embodiment, transaction manager 120 coordinates a two-phase commit transaction. Coordinating a two-phase commit transaction includes during a first phase, determining whether each participant can commit to a transaction, and during a second phase, directing each participant to commit if all are able or directing each participant to abort if not all participants are able to commit. If a participant indicates that it cannot commit the transaction, transaction manager 120 may veto the whole transaction. Thus, after the first phase each two-phase commit participant of the two-phase commit transaction is capable of either committing the transaction or rolling back the transaction and may wait in an indeterminate state before doing so. The two-phase commit transaction has an all or nothing effect; after the second phase either all participants of the two-phase commit transaction commit or none do so.

The transaction manager may execute on a computing device having at least one processor and memory. Client 105 may send a request to server 110 that causes transaction manager 120 to initiate a transaction. A participant of a transaction is registered with the transaction and may be a resource manager.

Figure 2:
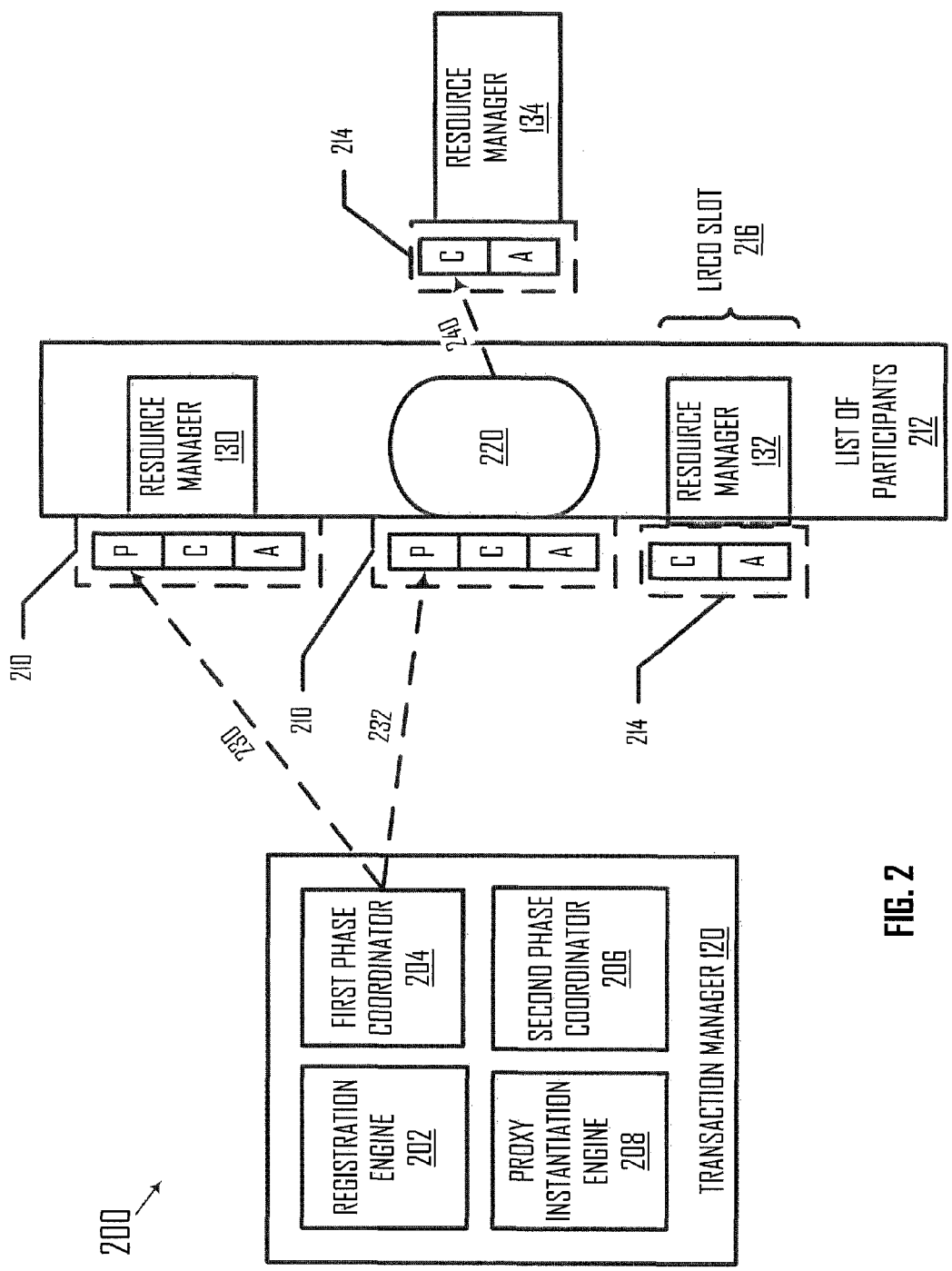
FIG. 2 is a block diagram illustrating a transaction manager coordinating a distributed transaction including a two-phase commit resource manager and multiple one-phase commit resource managers, according to an embodiment.

III. Example Interaction Between Transaction Manager and Registered Participants FIG. 2 is a block diagram 200 illustrating a transaction manager 120 coordinating a distributed transaction including a two-phase commit resource manager and multiple one-phase commit resource managers, according to an embodiment.

In an embodiment, a resource manager exposes a two-phase interface 210 having a prepare method "P", a commit method "C", and an abort method "A". Transaction manager 120 may interact with two-phase commit participants via interface 210. Although the interface is described as having these three methods, it should be understood that other embodiments in which two-phase interface 210 has different methods and/or fewer or more than three methods are within the scope of the disclosure. Transaction manager 120 may invoke each of these methods at an interface of a two-phase commit participant, which may cause the two-phase commit participant to perform an action.

Transaction manager 120 includes a first-phase coordinator 204 and a second-phase coordinator 206. During a first phase of the two-phase commit transaction, first-phase coordinator 204 sends a commit query to each two-phase commit participant included in a list of participants 212. List of participants 212 includes resource managers that are registered with the transaction. The commit query requests an indication of whether the respective participant can commit the transaction. In an example, first-phase coordinator 204 sends the commit query to a given two-phase commit participant in list of participants 212 via invocation of the prepare method "P" at the given participant's interface.

When first-phase coordinator 204 receives a first type of response to the commit query from each two-phase commit participant in list of participants 212, second-phase coordinator 206 sends a commit instruction to each two-phase commit participant in list of participants 212. The commit instruction instructs the respective participant to commit the transaction. In an example, second-phase coordinator 206 sends the commit instruction to a given two-phase commit participant via invocation of the commit method "C" at the given participant's interface. Responsive to the commit instruction, during a second phase of the two-phase commit transaction a subset of the two-phase commit participants included in list of participants 212 commits the transaction. The subset includes each of the two-phase commit participants in the list excluding any proxies that are included in list of participants 212. Proxies are described in greater detail below.

When first-phase coordinator 204 receives a second type of response to the commit query from at least one two-phase commit participant in list of participants 212, second-phase coordinator 206 sends an abort instruction to each two-phase participant in list of participants 212. The abort instruction instructs the respective participant to roll back the transaction. In an example, second-phase coordinator 206 sends the abort instruction to a given two-phase commit participant via invocation of the abort method "A" at the given participant's interface. Responsive to the abort instruction, during a second phase of the two-phase commit transaction each of the two-phase commit participants rolls back the transaction.

A resource manager may maintain a log. The log may be an undo log (e.g., log of committed changes that occur during a distributed transaction) and/or a redo log (log of uncommitted changes that occur during a distributed transaction). The redo log and/or undo log can be used to abort any changes that occurred during a distributed transaction if the transaction is aborted. Each resource manager that participates in a distributed transaction may be a participant of the transaction.

IV Registration

Transaction manager 120 includes a registration engine 202 that receives from a resource manager a request to register with the transaction. Registration engine 202 maintains list of participants 212 that includes one or more resource managers registered with the transaction. Resource managers that desire to be part of the transaction may register with the transaction via registration engine 202. Although transaction manager 120 is described as registering a resource manager, it should be understood that another registration entity different from transaction manager 120 may register resource managers and add them to list of participants 212.

A. No One-Phase Commit Participants

In an example, a resource manager sends a request to register with the transaction to registration engine 202, and registration engine 202 receives the request to register with the transaction. Registration engine 202 determines whether the resource manager is a two-phase commit resource manager (e.g., two-phase aware) or a one-phase commit resource manager (e.g., one-phase aware). Registration engine 202 may determine whether the resource manager is a two-phase commit resource manager or a one-phase commit resource manager in a variety of ways. In an example, a resource manager has a configuration file that indicates whether the resource manager is two-phase aware or one-phase aware. When the resource manager sends a request to register with the transaction, the resource manager may also send its configuration file to transaction manager 120. In another example, the resource manager may include annotations (e.g., Java annotations) or comments that indicate whether the resource manager is two-phase aware or one-phase aware.

If the resource manager is a two-phase commit resource manager, registration engine 202 adds the resource manager to list of participants 212. In the example illustrated in FIG. 2, first resource manager 130 exposes two-phase interface 210 having the prepare method "P", commit method "C", and abort method "A". First resource manager 130 is a two-phase commit resource manager. When first resource manager 130 sends the request to register with the transaction to registration engine 202, registration engine 202 determines that first resource manager 130 is a two-phase commit resource manager and adds first resource manager 130 to list of participants 212.

B. A Single One-Phase Commit Participant

If the resource manager is not a two-phase commit resource manager, however, registration engine 202 may perform further actions to determine whether to register the resource manager. In the example illustrated in FIG. 2, second resource manager 132 exposes a one-phase interface 214 having a commit method "C" and an abort method "A". Second resource manager 132 is a one-phase commit resource manager (e.g., can only commit or roll back, with no prepare). Because one-phase interface 214 does not have the prepare method "P", second resource manager 132 is unable to "prepare" to commit or abort. Transaction manager 120 communicates with second resource manager 132 via one-phase interface 214.

When second resource manager 132 sends the request to register with the transaction to registration engine 202, registration engine 202 may determine that second resource manager 132 is a one-phase commit resource manager. In an embodiment, registration engine 202 determines whether list of participants 212 includes at least one one-phase commit resource manager. If there are no one-phase commit resource managers registered with the transaction (e.g., included in list of participants 212), registration engine 202 adds second resource manager 132 to list of participants 212.

In an example, registration engine 202 inserts second resource manager 132 in a Last Resource Commit optimization (LRCO) slot 216 in list of participants 212. Thus, it is possible for a single resource that is one-phase aware to be enlisted in a transaction with two-phase commit participants. Registration engine 202 may ensure that only a single participant fills LRCO slot 216.

To ensure atomicity, the one-phase commit participant in LRCO slot 216 is the "last participant" in the two-phase commit protocol. Transaction manager 120 treats the one-phase commit participant slightly differently, in that transaction manager 120 executes the prepare phase on all other two-phase commit participants first. If transaction manager 120 intends to commit the transaction, transaction manager 120 passes control to the one-phase commit participant at LRCO slot 216. In such an example, if second resource manager 132 commits then transaction manager 120 logs the decision to commit and attempts to commit the other two-phase commit participants as well. In contrast, if second resource manager 132 aborts then transaction manager 120 logs the decision to abort and instructs the other two-phase commit participants to abort the transaction.

LRCO slot 216 may be considered the "last slot" or "last participant" in list of participants 212. The last slot or last participant in list of participants 212 may refer to the last participant that is requested by transaction manager 120 to commit (or abort) the transaction. It should be understood that the "last slot" in list of participants 212 does not necessarily mean the last position in the list. For example, LRCO slot 216 may be in a position different from the last position in the list and pointers may be used to direct transaction manager 120 to the last participant in the two-phase commit protocol, where the last participant is the one-phase commit participant occupying LRCO slot 216.

As discussed, it is difficult to enlist multiple one-phase commit resource managers in a single transaction. For example, transaction manager 120 may instruct a first one-phase commit resource manager to commit and may also instruct a second one-phase commit resource manager to commit. The first one-phase commit resource manager may commit successfully and the second one-phase commit resource manager may abort (e.g., because it was unable to commit), resulting in a non-atomic outcome. If more than two one-phase commit participants are part of the transaction, the situation could get even more complex. This disclosure provides techniques to enlist multiple one-phase commit resource managers in a single transaction and still have the all or nothing effect.

C. Multiple One-Phase Commit Participants

In the example illustrated in FIG. 2, third resource manager 134 exposes a one-phase interface 214 having a commit method "C" and an abort method "A". Because one-phase interface 214 does not have the prepare method "P", third resource manager 134 is unable to "prepare" to commit or abort. Third resource manager 134 is a one-phase commit resource manager. When third resource manager 134 sends the request to register with the transaction to registration engine 202, registration engine 202 may determine that third resource manager 134 is a one-phase commit resource manager. Registration engine 202 determines whether list of participants 212 already includes a one-phase commit participant. In keeping with the above example, second resource manager 132 occupies the only LRCO slot 216 in list of participants 212.

1. Proxy Creation

Transaction manager 120 includes a proxy instantiation engine 208. Proxy instantiation engine 208 may determine whether to create a proxy for third resource manager 134. A proxy wraps up a one-phase commit resource manager such that it is able to be a part of the transaction. The proxy may be considered a resource manager that manages a one-phase commit resource manager. Proxy instantiation engine 208 creates proxies that enable transaction manager 120 to interact with multiple one-phase commit resource managers and enable them to be part of the transaction.

Proxy instantiation engine 208 may determine whether to create a proxy for the one-phase commit resource manager based on whether it has a compensating transaction that undoes the work of the transaction that the one-phase commit resource manager is requested to commit. A one-phase commit resource manager may have a compensating transaction that puts a state of the one-phase commit resource manager at the same state before the one-phase commit resource manager committed the transaction. The one-phase commit resource manager may be "wrapped up" in a compensating transaction. In particular, the compensating transaction may be used to wrap up the one-phase commit participant to look like a two-phase commit participant.

Transaction manager 120 may identify the compensating transaction in a variety of ways. In an example, the compensating transaction is included in the one-phase commit resource manager's configuration file. In another example, the one-phase commit resource manager is annotated with the compensating transaction. When the one-phase commit resource manager includes a compensating transaction, proxy instantiation engine 208 may create a proxy for the one-phase commit resource manager.

The compensating transaction may be defined statically within each configuration for each resource manager. For instance, a developer or system administrator responsible for a legacy implementation may determine what the compensating transaction is for a particular resource manager and transaction, and include the compensating transaction in the configuration file or in an annotation or comment in the one-phase commit resource manager. In another example, the developer or system administrator may register the compensating transaction (e.g., class binary to use in the configuration information) so that transaction manager 120 may find the compensating transaction.

Alternatively, the compensating transaction may be built dynamically as the application runs. For instance, each object or server may annotate a compensation for each operation that may be called (e.g., a debit for a credit). Transaction manager 120 may keep track of the work done within the transaction and likewise the inverse (e.g., compensating transaction) that may be called by the proxy to roll back the transaction.

When the one-phase commit resource manager does not include a compensating transaction, however, proxy instantiation engine 208 may be unable to create a proxy for the one-phase commit resource manager. The developer or system administrator may not have gotten around to determining the compensating transaction for this particular type of resource manager. In such an example, transaction manager 120 may be unable to wrap the one-phase commit resource manager in a proxy. Accordingly, proxy instantiation engine 208 does not create a proxy for the particular one-phase commit resource manager.

If the current one-phase commit resource manager in LRCO slot 216 includes a compensating transaction, proxy instantiation engine 208 may create a proxy for the current one-phase commit resource manager in LRCO slot 216, remove the current one-phase commit resource manager from LRCO slot 216, and then insert the one-phase commit resource manager that does not have a compensating transaction in LRCO slot 216.

2. Register Proxy Instead of the One-Phase Commit Resource Manager

In the example illustrated in FIG. 2, when list of participants 212 is determined to include at least one one-phase commit resource manager, proxy instantiation engine 208 creates proxy 220 for third resource manager 134 and adds proxy 220 to list of participants 212. In such an example, third resource manager 134 is not included in list of participants 212. As illustrated in FIG. 2, third resource manager 134 is outside of list of participants 212. Proxy 220 may be inserted in list of participants 212 such that proxy 220 is not the last participant in the two-phase commit protocol. As discussed above, the one-phase commit resource manager in LRCO 216 is the last participant in the two-phase commit protocol.

In an embodiment, transaction manager 120 communicates with third resource manager 134 via two-phase interface 210 having the prepare method "P", commit method "C", and abort method "A". Proxy 210 supports a prepare operation, commit operation, and abort operation. The prepare operation corresponds to the prepare method of two-phase interface 210, the commit operation corresponds to the commit method of two-phase interface 210, and the abort operation corresponds to the abort method of two-phase interface 210.

Transaction manager 120 interacts with third resource manager 134 via proxy 220's two-phase interface 210. Although transaction manager 120 interacts with third resource manager 134 via proxy 220, neither transaction manager 120 nor third resource manager 134 knows about proxy 220. Proxy 220 is transparent to transaction manager 120 and third resource manager 134. For example, transaction manager 120 thinks that it is interacting directly with third resource manager 134, and third resource manager 134 thinks that it is interacting directly with transaction manager 120. Accordingly, transaction manager 120 treats third resource manager 134, which is a one-phase commit resource manager, as if it were a two-phase commit resource manager by interacting with proxy 220. As such, it is unnecessary to change third resource manager 134. Accordingly, legacy implementations may be wrapped up with a proxy to enable the legacy implementation to be part of the transaction without changing the legacy implementation.

In the above example, although transaction manager 120 creates a proxy for the last one-phase commit resource manager that requests registration with the transaction, this is not intended to be limiting. Although this may have its advantages (e.g., second resource manager 132 has already been registered with the transaction and inserted in LRCO slot 216), in another example, transaction manager 120 creates a proxy for second resource manager 132 in LRCO slot 216, unregisters second resource manager 132, and registers third resource manager 134.

It should also be understood that transaction manager 120 may create a proxy for one or more one-phase commit resource managers. Transaction manager 120 may also create a proxy for the one-phase commit resource manager in the LRCO slot 216 such that no resource manager occupies that slot. In another embodiment, list of participants 212 does not include LRCO slot 216 and each one-phase commit resource manager that wishes to participant in a transaction is wrapped in a proxy. In such an embodiment, it may be unnecessary for transaction manager 120 to determine whether a list of registered participants of the transaction includes at least one one-phase commit resource manager because it does not have LRCO slot 216 in which to insert the one-phase commit resource manager. In an example, when transaction manager 120 determines that the resource manager requesting to be registered with the transaction is a one-phase commit resource manager, transaction manager 120 may create a proxy for the one-phase commit resource manager.

V. Two-Phase Commit Transaction

A. First Phase of Two-Phase Commit Transaction

First resource manager 130 and proxy 220 are the two-phase commit participants included in list of participants 212. During a prepare phase of a two-phase commit transaction, first-phase coordinator 204 sends a commit query to first resource manager 130 and proxy 220. In an example, first-phase coordinator 204 invokes the prepare method "P" of two-phase interface 210 at each of first resource manager 130 and proxy 220, as indicated by dashed arrows 230 and 232, respectively. The commit query requests an indication of whether the respective participant can commit the transaction. If a two-phase commit participant can commit to the transaction, the two-phase commit participant sends a commit message to first-phase coordinator 204. If the two-phase commit participant cannot commit to the transaction, the two-phase commit participant sends an abort message to first-phase coordinator 204. First-phase coordinator 204 may receive a response to the commit query from first resource manager 130 and proxy 220.

Each of the two-phase commit participants implements a prepare method. Additionally, each of the two-phase commit participants may implement the prepare method differently. In an example, responsive to the commit query (e.g., invocation of the prepare method "P" of first resource manager 130's two-phase interface 210), first resource manager 130 determines whether it can commit to the transaction, and sends a commit message or an abort message based on whether first resource manager 130 can commit to the transaction to first-phase coordinator 204.

In another example, responsive to the invocation of the prepare method "P" of proxy 220's two-phase interface 210, proxy 220 instructs third resource manager 134 to commit or abort the transaction immediately upon making a commit or abort decision, rather than waiting for a further commit or abort command. In an example, proxy 220 invokes the commit method "C" of third resource manager 134's one-phase interface 214, as indicated by a dashed arrow 240.

Responsive to the invocation of the commit method "C" of third resource manager 134's one-phase interface 214, third resource manager 134 attempts to commit the transaction. Proxy 220 determines whether the third resource manager 134 successfully commits or aborts the transaction. Accordingly, during the first phase of the two-phase commit transaction, third resource manager 134 may commit the transaction and no two-phase commit participants commit the transaction. If third resource manager 314 successfully commits the transaction, proxy 220 sends a commit message to first-phase coordinator 204, where the commit message indicates that proxy 220 can commit to the transaction. In such an example, although third resource manager 134 has already committed the transaction, proxy 220 still sends a commit message indicating that it is prepared to commit to the transaction.

In contrast, if resource manager 314 cannot commit the transaction, proxy 220 sends an abort message to first-phase coordinator 204, where the abort message indicates that proxy 220 is not able to commit to the transaction. In such an example, although third resource manager 134 has already aborted the transaction, proxy 220 still sends an abort message indicating that it is not able to commit to the transaction.

B. Second Phase of Two-Phase Commit Transaction

1. Commit Instruction

When first-phase coordinator 204 receives a first type of response to the commit query from each two-phase commit participant in the list, second-phase coordinator 206 sends a commit instruction to each two-phase commit participant in the list. In an example, the first type of response is a commit message. The commit instruction instructs the respective participant to commit the transaction. In such an example, during a commit/abort phase of the two-phase commit transaction, second-phase coordinator 206 sends the commit instruction to first resource manager 130 and proxy 220.

Figure 3:
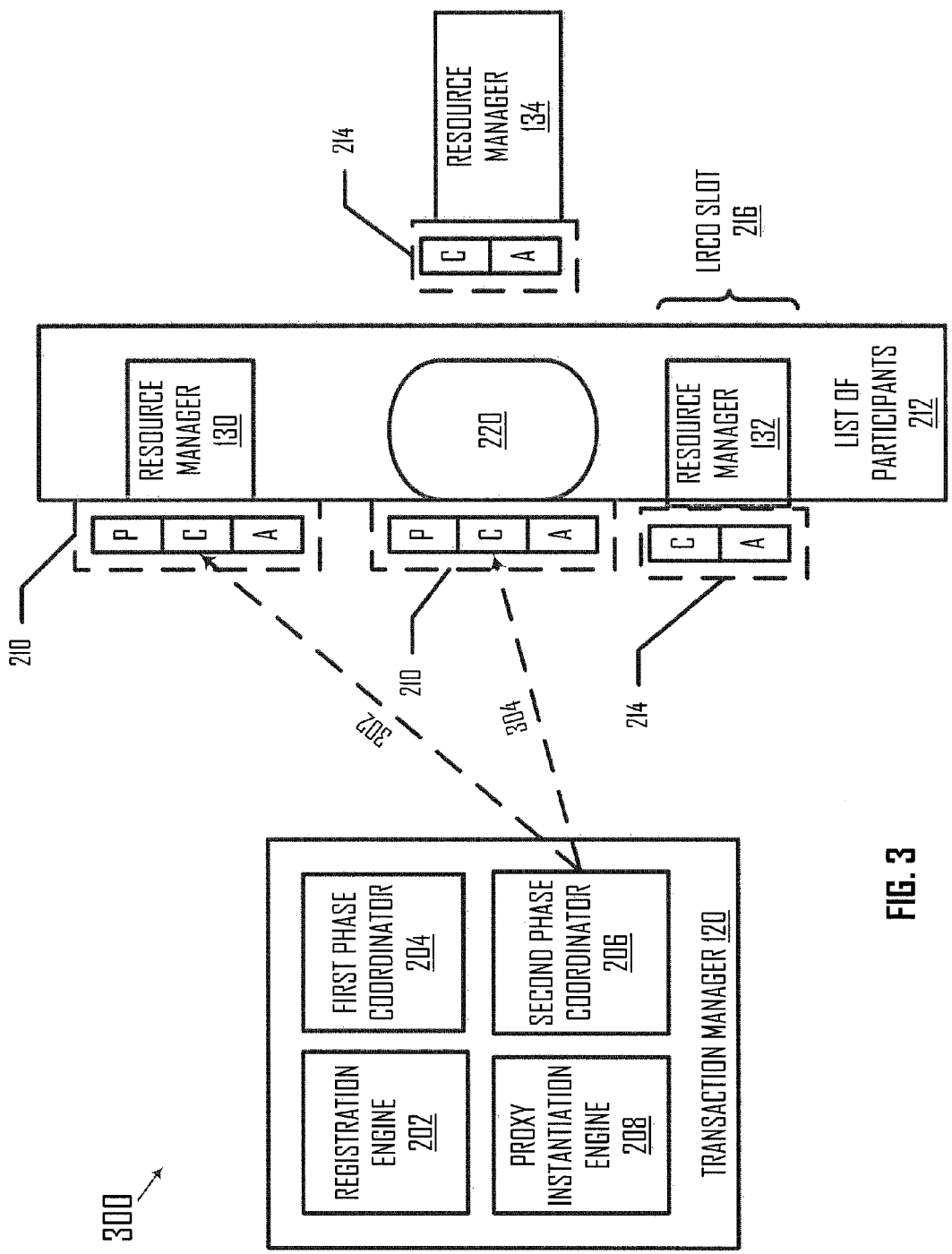
FIG. 3 is a block diagram illustrating a second-phase coordinator sending a commit instruction to the two-phase commit participants, according to an embodiment.

FIG. 3 is a block diagram 300 illustrating second-phase coordinator 206 sending a commit instruction to the two-phase commit participants in list of participants 212, according to an embodiment. In the example illustrated in FIG. 3, second-phase coordinator 206 invokes the commit method "C" of two-phase interface 210 at each of first resource manager 130 and proxy 220, as indicated by dashed arrows 302 and 304, respectively.

Each of the two-phase commit participants implements a commit method. Each of the two-phase commit participants may implement the commit method differently. In an example, responsive to the commit instruction, during a second phase of the two-phase commit transaction a subset of the two-phase commit participants commits the transaction. The subset includes each of the two-phase commit participants in the list excluding the proxies. In keeping with the above example, the subset includes first resource manager 130 (and does not include proxy 220). As such, responsive to the commit instruction (e.g., invocation of the commit method "C" of first resource manager 130's two-phase interface 210), first resource manager 130 commits the transaction by executing first resource manager 130's commit operation. When first resource manager 130 executes the commit operation, first resource manager 130 commits the transaction.

In another example, responsive to the commit instruction (e.g., invocation of the commit method "C" of proxy 220's two-phase interface 210), during a second phase of the two-phase commit transaction proxy 220 and third resource manager 134 do nothing because third resource manager 134 has already committed the transaction. As a one-phase commit resource manager, third resource manager 134 commits or aborts the transaction as soon as third resource manager 134 makes a commit or abort decision, which third resource manager 134 does during the first phase of the two-phase transaction. Thus, by the time the second phase begins, third resource manager 134 may have already performed the work and committed the transaction (or may have already aborted the transaction). In an example, proxy 220's implementation of the commit operation may simply be a function signature with a return instruction in the body of the function.

B. Abort Instruction

When first-phase coordinator 204 receives a second type of response to the commit query from at least one participant in the list, second-phase coordinator 206 sends an abort instruction to each two-phase commit participant in the list. In an example, the second type of response is an abort message. The abort instruction instructs the respective participant to roll back the transaction. In such an example, during a commit/abort phase of the two-phase commit transaction, second-phase coordinator 206 sends the abort instruction to first resource manager 130 and proxy 220.

Figure 4:
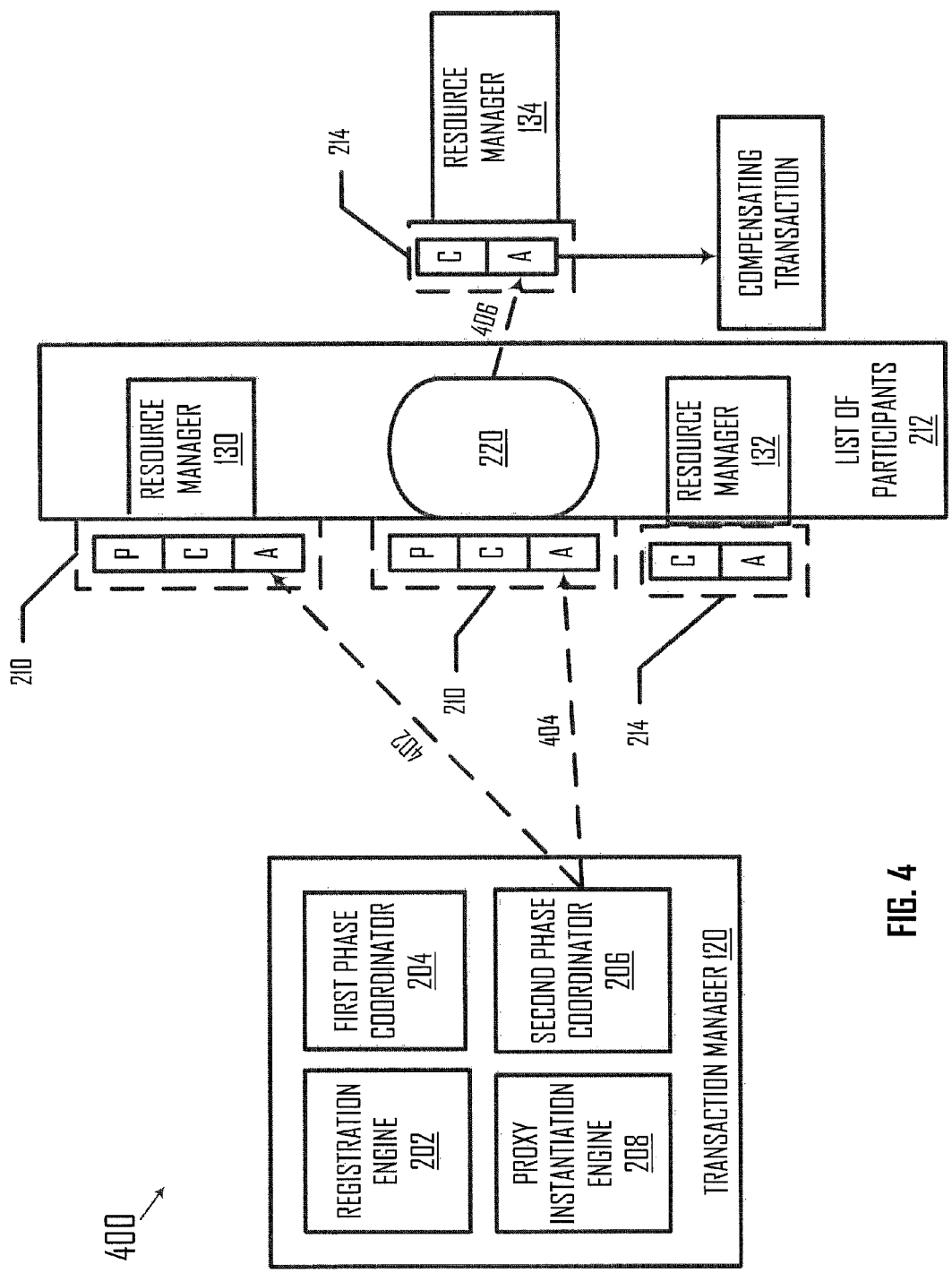
FIG. 4 is a block diagram illustrating the second-phase coordinator sending an abort instruction to the two-phase commit participants, according to an embodiment.

FIG. 4 is a block diagram 400 illustrating second-phase coordinator 206 sending an abort instruction to the two-phase commit participants in list of participants 212, according to an embodiment. In the example illustrated in FIG. 4, second-phase coordinator 206 invokes the abort method "A" of two-phase interface 210 at each of first resource manager 130 and proxy 220, as indicated by dashed arrows 402 and 404, respectively.

Each of the two-phase commit participants implements an abort method. Additionally, each of the two-phase commit participants may implement the abort method differently. In an example, responsive to the abort instruction, during a second phase of the two-phase commit transaction each of the two-phase commit participants rolls back the transaction. As such, responsive to the abort instruction (e.g., invocation of the abort method "A" of first resource manager 130's two-phase interface 210), first resource manager 130 aborts the transaction by executing first resource manager 130's abort operation. When first resource manager 130 executes the abort operation, first resource manager 130 rolls back the transaction.

In another example, responsive to the abort instruction (e.g., invocation of the abort method "A" of proxy 220's two-phase interface 210), during a second phase of the two-phase commit transaction proxy 220 executes the abort operation. The abort operation supported by the proxy includes a compensating transaction that undoes the transaction previously committed by third resource manager 134 during the first phase. In an embodiment, when proxy 220 executes its abort operation, proxy 220 executes the identified compensating transaction. Execution of the compensating transaction undoes the transaction committed by third resource manager 134 during the first phase of the two-phase commit transaction. A state of third resource manager 134 before the transaction may be the same as a state of third resource manager 134 after execution of proxy 220's abort operation.

Additionally, second-phase coordinator 206 may send an abort instruction before first-phase coordinator 204 sends a commit query if, for example, transaction manager 120 wants to abort or rollback the transaction in the first phase or if a participant earlier in list of participants 212 sends an abort message.

As discussed above and further emphasized here, FIGS. 1-4 are merely examples, which should not unduly limit the scope of the claims. For example, it should be understood that one or more components in FIG. 2 (e.g., registration engine 202, first-phase coordinator 204, second-phase coordinator 206, or proxy instantiation engine 208) may be combined with another module. It should also be understood that one or more modules in FIG. 2 may be separated into more than one module.

Additionally, any node that includes transaction manager 120 is capable of operating as a coordinator node of the transaction. Generally, it is a node at which a transaction is begun or requested that operates as the coordinator node for that distributed transaction. However, it is not a requirement that a node that begins a transaction act as the coordinator node for that transaction. Moreover, a coordinator node may hand responsibility over to another node, causing that other node to become the coordinator node. It should also be understood that a participant in list of participants 212 may include a transaction manager.

Moreover, although the disclosure describes a resource manager as being either a one-phase commit participant or a two-phase commit participant, it should also be understood that other embodiments in which the resource manager commits in more than two phases are within the scope of the disclosure.

VI. Example Method

Figure 5:
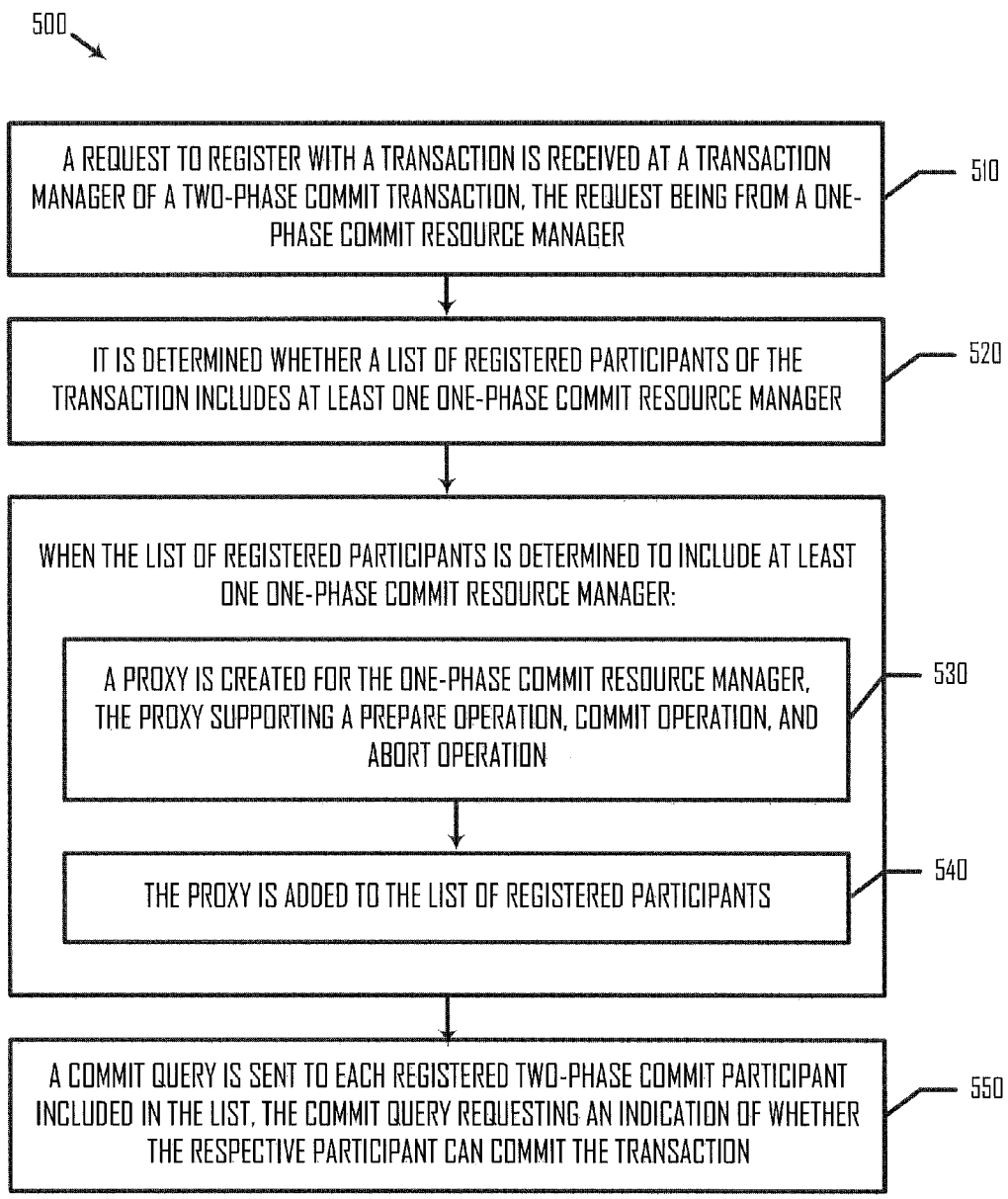
FIG. 5 is a flowchart illustrating a method of processing a distributed transaction, according to an embodiment.

FIG. 5 is a flowchart illustrating a method 500 of processing a distributed transaction, according to an embodiment. Method 500 is not meant to be limiting and may be used in other applications.

In FIG. 5, method 500 includes blocks 510-550. In a block 510, a request to register with a transaction is received at a transaction manager of a two-phase commit transaction, the request being from a one-phase commit resource manager. In an example, transaction manager 120 receives a request to register with a transaction, the request being from third resource manager 134, which is a one-phase commit resource manager.

In a block 520, it is determined whether a list of registered participants of the transaction includes at least one one-phase commit resource manager. In an example, registration engine 202 determines whether list of registered participants 212 of the transaction includes at least one one-phase commit resource manager.

When the list of registered participants is determined to include at least one one-phase commit resource manager, process flow proceeds to blocks 530 and 540. In a block 530, a proxy is created for the one-phase commit resource manager, the proxy supporting a prepare operation, commit operation, and abort operation. In an example, proxy instantiation engine 208 creates proxy 220 for third resource manager 134, proxy 220 supporting a prepare operation, commit operation, and abort operation. In a block 540, the proxy is added to the list of registered participants. In an example, proxy instantiation engine 212 adds proxy 220 to list of registered participants 212.

In a block 550, a commit query is sent to each registered two-phase commit participant included in the list, the commit query requesting an indication of whether the respective participant can commit the transaction. In an example, first-phase coordinator 204 sends a commit query to each registered two-phase commit participant included in list of registered participants 212, the commit query requesting an indication of whether the respective participant can commit the transaction.

It is also understood that additional processes may be inserted before, during, or after blocks 510-550 discussed above. It is also understood that one or more of the blocks of method 500 described herein may be omitted, combined, or performed in a different sequence as desired.

VII. Example Computing System

Figure 6:
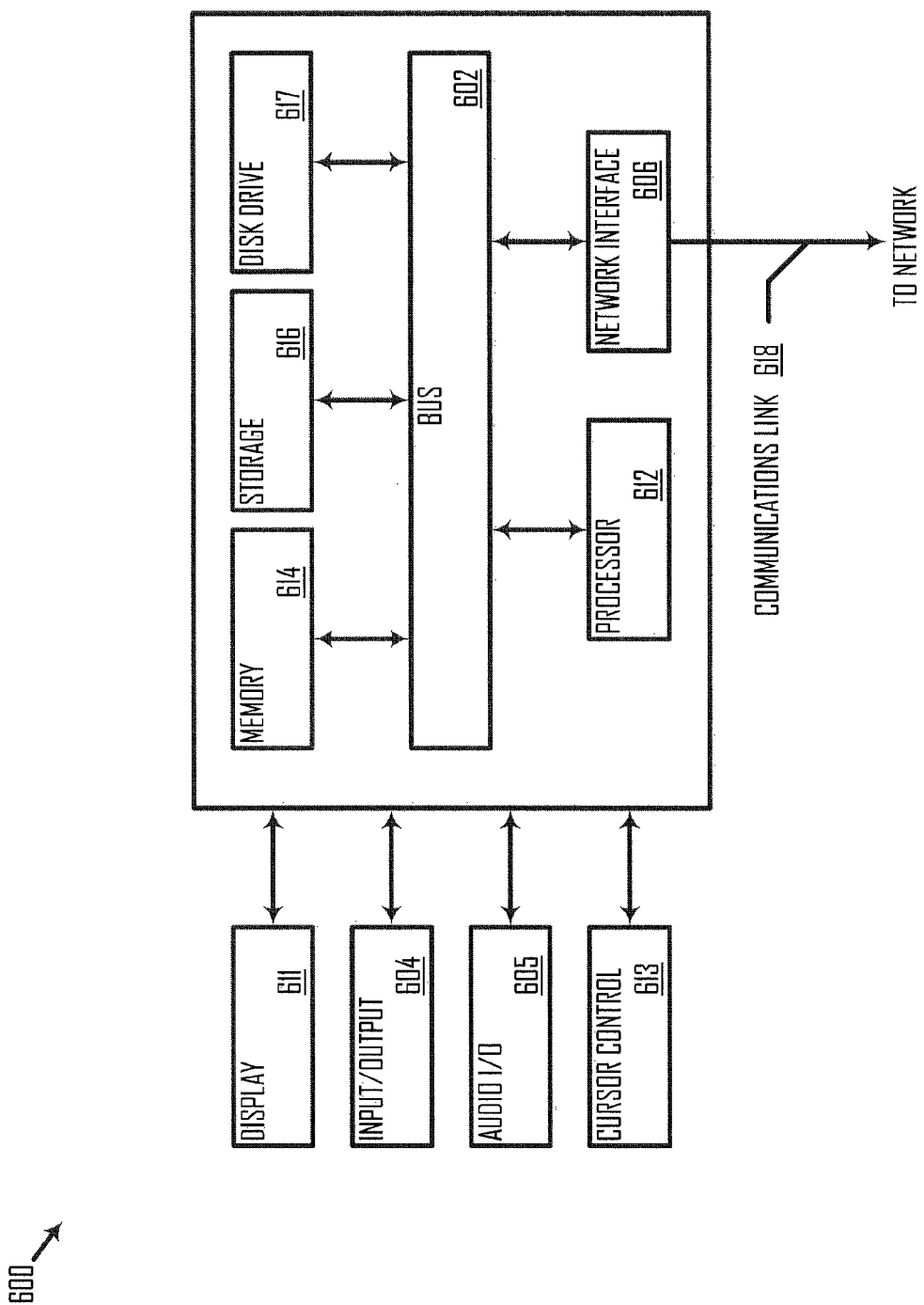
FIG. 6 is a block diagram of an electronic system suitable for implementing one or more embodiments of the present disclosure.

FIG. 6 is a block diagram of a computer system 600 suitable for implementing one or more embodiments of the present disclosure. Each of registration engine 202, first-phase coordinator 204, second-phase coordinator 206, and proxy instantiation engine 208 may execute on a computing device. The computing device may additionally include one or more storage devices each selected from a group including a floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 600 includes a bus 602 or other communication mechanism for communicating information data, signals, and information between various components of computer system 600. A processor 612, which may be a micro-controller, digital signal processor (DSP), or other processing component, processes these various signals, such as for display on computer system 600 or transmission to other devices via communication link 618. Components of computer system 600 also include a system memory component 614 (e.g., RAM), a static storage component 616 (e.g., ROM), and/or a disk drive 617. Computer system 600 performs specific operations by processor 612 and other components by executing one or more sequences of instructions contained in system memory component 614.

To enable processor 612 to access data stored in the memory space of the other, an application is executed that includes instructions that manually copy data back and forth between the separate memory spaces. Components include an input/output (I/O) component 604 that processes a user action, such as selecting keys from a keypad/keyboard, selecting one or more buttons or links, etc., and sends a corresponding signal to bus 602. I/O component 604 may also include an output component such as a display 611, and an input control such as a cursor control 613 (such as a keyboard, keypad, mouse, etc.). An optional audio input/output component 605 may also be included to allow a user to use voice for inputting information by converting audio signals into information signals. Audio I/O component 605 may allow the user to hear audio. A transceiver or network interface 606 transmits and receives signals between computer system 600 and other devices via a communication link 618 to a network. In an embodiment, the transmission is wireless, although other transmission mediums and methods may also be suitable.

Logic may be encoded in a computer readable medium, which may refer to any medium that participates in providing instructions to processor 612 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 614, and transmission media includes coaxial cables, copper wire, and fiber optics, including wires that include bus 602. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read. In various embodiments of the present disclosure, execution of instruction sequences to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various blocks described herein may be changed, combined into composite blocks, and/or separated into sub-blocks to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A method of processing a distributed transaction, comprising:
    receiving at a transaction manager of a two-phase commit transaction a request to register with a transaction, the request being from a one-phase commit resource manager;
    determining whether a list of registered participants of the transaction includes at least one one-phase commit resource manager;
    when the list of registered participants is determined to include at least one one-phase commit resource manager:
        creating a proxy for the one-phase commit resource manager, the proxy supporting a prepare operation, commit operation, and abort operation; and
        adding the proxy to the list of registered participants; and
    sending a commit query to each registered two-phase commit participant included in the list, the commit query requesting an indication of whether the respective participant can commit the transaction.

2. The method of claim 1, wherein when the list of registered participants is determined to include at least one one-phase commit resource manager, the one-phase commit resource manager is not included in the list of registered participants.

3. The method of claim 2, wherein the list of registered participants is determined to include at least one one-phase commit resource manager, the method further including:
    receiving from the proxy a response to the commit query, wherein during a first phase of the two-phase commit transaction, the one-phase commit resource manager commits the transaction and no two-phase commit participants registered with the transaction commit the transaction.

4. The method of claim 3, further including:
    when a first type of response to the commit query is received from each two-phase commit participant in the list, sending a commit instruction to each two-phase commit participant in the list, the commit instruction instructing the respective participant to commit the transaction.

5. The method of claim 4, wherein responsive to the commit instruction, during a second phase of the two-phase commit transaction a subset of the two-phase commit participants commits the transaction, and wherein the subset includes each of the two-phase commit participants in the list excluding the proxy.

6. The method of claim 4, further including:
    when a second type of response to the commit query is received from at least one participant in the list, sending an abort instruction to each two-phase participant in the list, the abort instruction instructing the respective participant to roll back the transaction.

7. The method of claim 6, further including:
    identifying a compensating transaction for the one-phase commit resource manager, wherein the abort operation supported by the proxy includes the compensating transaction.

8. The method of claim 7, wherein responsive to the abort instruction, during a second phase of the two-phase commit transaction the proxy executes the abort operation.

9. The method of claim 8, wherein when the proxy executes the abort operation, the proxy executes the identified compensating transaction, and wherein execution of the compensating transaction rolls back the transaction committed by the one-phase commit resource manager during the first phase of the two-phase commit transaction.

10. The method of claim 9, wherein after the proxy executes the abort operation, a state of each of the list of participants before the transaction is the same as a state of the corresponding participant after the transaction.

11. The method of claim 6, further including:
    interacting with the proxy via an interface including prepare, commit, and abort methods, wherein the sending a commit query includes invoking the prepare method of the interface, wherein the sending a commit instruction includes invoking the commit method of the interface, and wherein the sending an abort instruction includes invoking the abort method of the interface.

12. A system for processing a distributed transaction, comprising:
    a registration engine coupled to a network, wherein the registration engine receives a request to register with a transaction, the request being from a one-phase commit resource manager;
    a proxy instantiation engine that determines whether a list of registered participants of the transaction includes at least one one-phase commit resource manager, wherein when the list of registered participants is determined to include at least one one-phase commit resource manager, the proxy instantiation engine: (i) creates a proxy for the one-phase commit resource manager, and (ii) adds the proxy to the list of registered participants, and wherein the proxy supports a prepare operation, commit operation, and abort operation; and
    a first-phase coordinator that coordinates a first phase of the two-phase commit transaction, wherein the first-phase coordinator sends a commit query to each registered two-phase commit participant included in the list, and wherein the commit query requests an indication of whether the respective participant can commit the transaction.

13. The system of claim 12, wherein when the list of registered participants is determined to include at least one one-phase commit resource manager, the one-phase commit resource manager is not included in the list of registered participants.

14. The system of claim 13, wherein the list of registered participants is determined to include at least one one-phase commit resource manager, wherein the first-phase coordinator receives from the proxy a response to the commit query, and wherein during a first phase of the two-phase commit transaction, the one-phase commit resource manager commits the transaction and no two-phase commit participants registered with the transaction commit the transaction.

15. The system of claim 14, further including:
a second-phase coordinator that coordinates a second phase of the two-phase commit transaction, wherein when the first-phase coordinator receives a first type of response to the commit query from each two-phase commit participant in the list, the second-phase coordinator sends a commit instruction to each two-phase commit participant in the list, and wherein the commit instruction instructs the respective participant to commit the transaction.

16. The system of claim 15, wherein when the first-phase coordinator receives a second type of response to the commit query from at least one participant in the list, the second-phase coordinator sends an abort instruction to each two-phase participant in the list, and wherein the abort instruction instructs the respective participant to roll back the transaction.

17. The system of claim 16, wherein responsive to the abort instruction, during a second phase of the two-phase commit transaction the proxy executes the abort operation, and wherein when the proxy executes the abort operation, the proxy executes a compensating transaction that rolls back the transaction committed by the one-phase commit resource manager during the first phase of the two-phase commit transaction.

18. The system of claim 17, further including:
a transaction manager that includes the registration engine, proxy instantiation engine, first-phase coordinator, and second-phase coordinator, wherein when the list of registered participants is determined to include at least one one-phase commit resource manager, the transaction manager interacts with the proxy and does not interact with the one-phase commit resource manager.

19. The system of claim 18, wherein the transaction manager interacts with each of the list of registered participants via an interface including prepare, commit, and abort methods, wherein the first-phase coordinator sends the commit query to a given participant in the list via invocation of the prepare method at the given participant's interface, wherein the second-phase coordinator sends the commit instruction to the given participant via invocation of the commit method at the given participant's interface, and wherein the second-phase coordinator sends the abort instruction to the given participant via invocation of the abort method at the given participant's interface.

20. A non-transitory machine-readable medium comprising a plurality of machine-readable instructions that when executed by one or more processors is adapted to cause the one or more processors to perform a method comprising:
receiving a request to register with a transaction, the request being from a one-phase commit resource manager;
determining whether a list of registered participants of the transaction includes at least one one-phase commit resource manager;
when the list of registered participants is determined to include at least one one-phase commit resource manager:
creating a proxy for the one-phase commit resource manager, the proxy supporting a prepare operation, commit operation, and abort operation; and
adding the proxy to the list of registered participants; and
sending a commit query to each registered two-phase commit participant included in the list, the commit query requesting an indication of whether the respective participant can commit the transaction.

* * * * *